United States Patent [19]
Ohashi et al.

[11] Patent Number: 5,960,669
[45] Date of Patent: Oct. 5, 1999

[54] SYSTEM FOR ESTIMATING TEMPERATURE OF VEHICLE HYDRAULICALLY-OPERATED TRANSMISSION

[75] Inventors: Tatsuyuki Ohashi; Yoshirou Tashiro; Toshiyuki Suzuki; Kaname Tokita, all of Wako, Japan

[73] Assignee: Honda Giken Kogyo Kabushiki Kaisha, Tokyo, Japan

[21] Appl. No.: 08/921,353

[22] Filed: Aug. 29, 1997

[30] Foreign Application Priority Data

Aug. 30, 1996 [JP] Japan .................................. 8-248868

[51] Int. Cl.$^6$ .................................................. F16H 59/68
[52] U.S. Cl. ................................ 74/335; 477/98; 374/145
[58] Field of Search ................................ 477/98, 97, 76; 701/65; 74/730–1, 731.1, 733–1, 732.1; 374/144, 145

[56] References Cited

U.S. PATENT DOCUMENTS

| 4,928,235 | 5/1990 | Mehta et al. ............................. 701/65 |
| 5,261,295 | 11/1993 | Iwanaga et al. . |
| 5,319,555 | 6/1994 | Iwaki et al. ........................... 477/98 X |
| 5,319,963 | 6/1994 | Benford ................................. 73/118.1 |
| 5,676,619 | 10/1997 | Ohashi et al. ........................... 477/98 |
| 5,680,307 | 10/1997 | Issa et al. ............................. 74/335 X |
| 5,681,237 | 10/1997 | Furukawa et al. ....................... 477/98 |
| 5,707,315 | 1/1998 | Furukawa et al. ....................... 477/98 |

FOREIGN PATENT DOCUMENTS

| 0 482 691 A1 | 4/1992 | European Pat. Off. . |
| 62-63248 | 3/1987 | Japan . |
| 8-121583 | 5/1996 | Japan . |
| 8-233080 | 9/1996 | Japan . |

Primary Examiner—Dirk Wright
Assistant Examiner—Peter T. Kwon
Attorney, Agent, or Firm—Armstrong, Westerman, Hattori, McLeland & Naughton

[57] ABSTRACT

A system for estimating a temperature of a vehicle hydraulically-operated transmission including a hydraulic torque converter, a plurality of frictional engaging elements such as clutches installed in the transmission and a hydraulic pressure supplying circuit for discharging hydraulic fluid from one of said plurality of frictional engaging elements and for supplying hydraulic fluid to another to bring said one and another one of said plurality of frictional engaging elements into operation such that gear-shift is effected in the transmission. A heat quantity generated by the hydraulic coupling means ($\Delta Ttr$), a heat quantity generated by at least one of the frictional engaging elements at gearshift ($\Delta Tcl$ (No)), a heat quantity generated by stirring of the hydraulic fluid ($Tst$), a heat quantity generated or absorbed at a heat exchanger which exchanges heat from the fluid ($\Delta Tra$), and some similar values are calculated and summed to estimate a temperature of the clutches, thereby enabling a fine hydraulic pressure control.

28 Claims, 3 Drawing Sheets

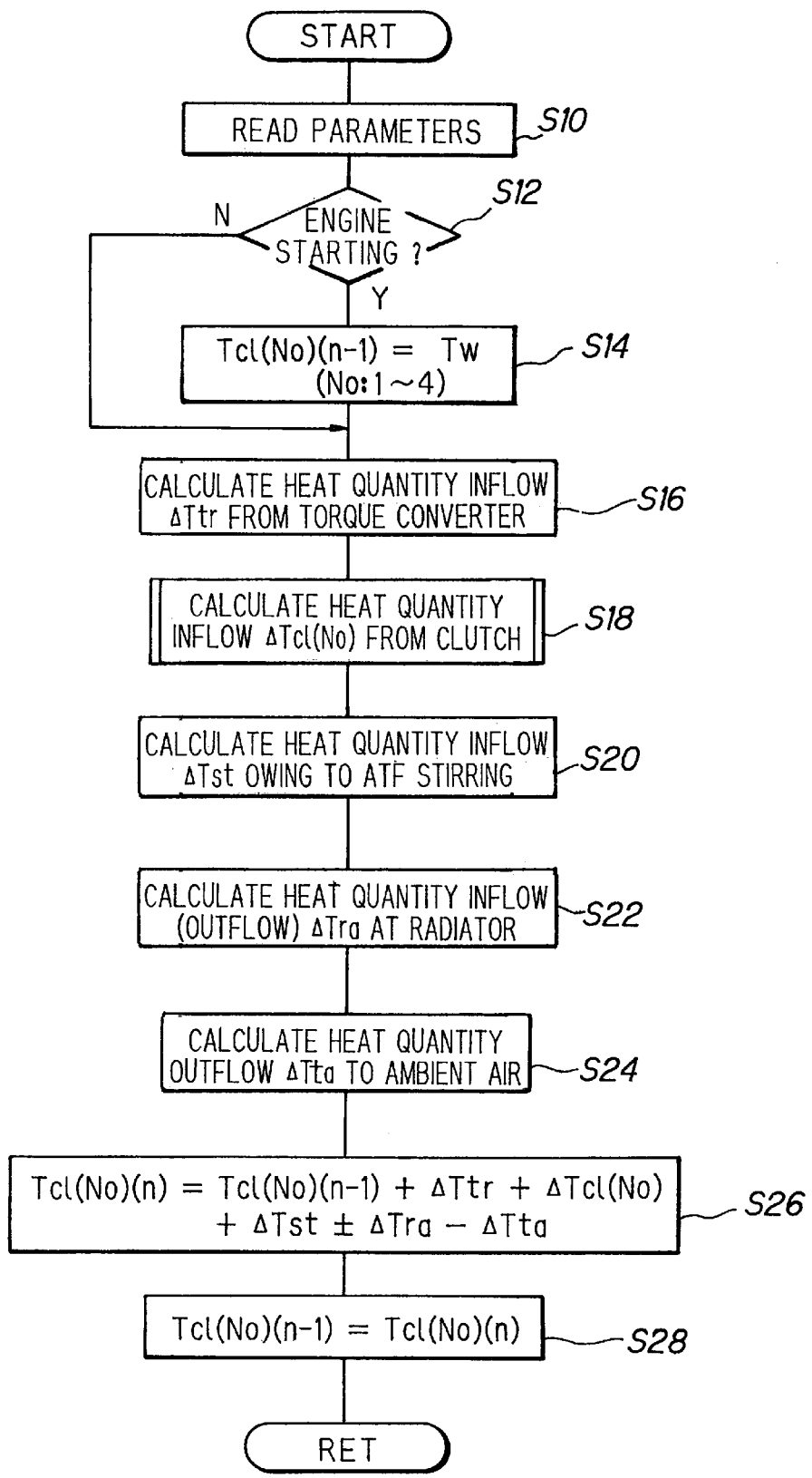

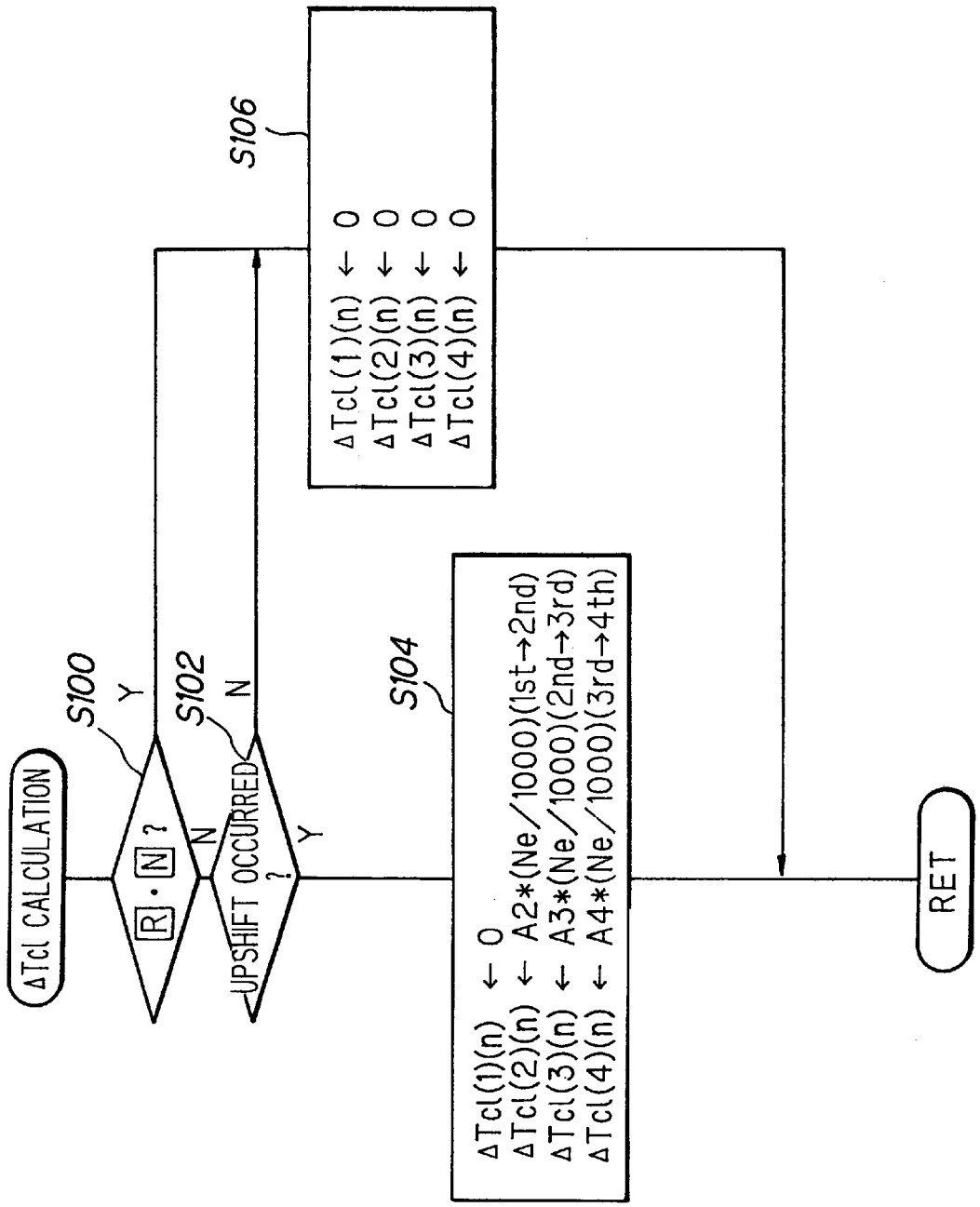

SYSTEM FOR ESTIMATING TEMPERATURE OF VEHICLE HYDRAULICALLY-OPERATED TRANSMISSION

BACKGROUND OF THE INVENTION

1. Field of the Invention

This invention relates to a system for estimating the temperature of a vehicle hydraulically-operated transmission, more specifically to such a system for accurately estimating the temperature of a frictional engagement element such as a hydraulic clutch or some similar elements in a hydraulic actuation type automatic transmission which transmits drive torque by use of a hydraulic circuit and the frictional engagement elements.

2. Description of the Related Art

Generally speaking, vehicle automatic transmissions, particularly hydraulically-operated automatic transmissions, are operated by operating oil (automatic transmission fluid or ATF). The ATF hydraulic pressure is regulated in line with various objectives so as to control gear-shift shock, torque converter lockup, clutch slip and the like. Since the viscosity of the ATF varies with temperature (is high at low temperature and low at high temperature), the pressure rise and fall characteristics of the ATF also vary with temperature. This destabilizes the control.

Japanese Patent Laid-Open Application No. Sho 62(1987)-63,248 teaches a technology for coping with this problem by providing a solenoid valve in the hydraulic control circuit, controlling the duty ratio of pulse trains (Pulse Width Modulation) to be supplied to the solenoid valve to precisely regulate the oil pressure, providing an oil temperature sensor in the hydraulic control circuit, and correcting the duty ratio as a function of the detected ATF temperature, thereby preventing problems caused by variation in the ATF temperature.

Since oil temperature sensors are expensive, however, the general practice is to control the oil pressure of the automatic transmission using the engine coolant temperature, which is a required parameter for engine control anyway. Although the variation of the engine coolant temperature is ordinarily close to that of the ATF temperature, it may at times deviate greatly therefrom depending on the vehicle operating condition. Because of this, the prior art systems conduct the control using broadly defined temperature zones which cannot be used for fine control.

In Japanese Patent Laid-Open Application No. Hei 7(1995)-68,756 (filed in the United States under the number of Ser. No. 08/610,140 on Feb. 29, 1996), the assignee therefore proposed a control system for enabling accurate estimation of the ATF temperature from the engine coolant temperature or the like, without use of an expensive oil temperature sensor, thereby enabling fine hydraulic pressure control based on the estimated ATF temperature.

This earlier system can only estimate the average ATF temperature of the transmission as a whole, however, it cannot estimate the temperature rise produced momentarily by the large quantity of heat generated by the clutches during gear-shift. It is therefore susceptible to problems such as increased gear-shift shock caused by deviation of the coefficient of friction of the clutch friction material from the initial temperature characteristics and degradation of clutch durability owing to temperature increase.

An attempt to overcome these problems by equipping the clutches with oil temperature sensors or other such measurement means is problematic due to the fact that the clutches themselves rotate which would necessitate a complex sensor structure including electrical contacting means for taking out the sensor output signal, such as a slip ring and brush. Even then, high detection accuracy could not be expected.

BRIEF SUMMARY OF THE INVENTION

An object of this invention is therefore to overcome the aforesaid drawbacks by providing a system for estimating the temperature of a vehicle hydraulically-operated transmission which enables accurate estimation of the temperature of hydraulic clutches or other frictional engagement elements from the engine coolant temperature, without use of an oil temperature sensor, thereby enabling hydraulic pressure control based on the estimated ATF temperature to be conducted appropriately to prevent unexpected gearshift shock and degradation of clutch durability.

This invention achieves this object by providing a system for estimating a temperature of a vehicle hydraulically-operated transmission including a hydraulic coupling means having an input connected to an internal combustion engine mounted on the vehicle and an output connected to a gear system of the transmission, comprising a plurality of frictional engaging elements installed in the transmission; a hydraulic pressure supplying circuit for discharging hydraulic pressure from one of said plurality of frictional engaging elements and for supplying hydraulic pressure to another one of said plurality of frictional engaging elements to bring said one and another one of said plurality of frictional engaging elements into operation such that gear-shift is effected in the transmission; coolant temperature detecting means for detecting a coolant temperature of the engine; first heat quantity calculating means for calculating a heat quantity generated by the hydraulic coupling means; second heat quantity calculating means for calculating a heat quantity generated by at least one of the frictional engaging elements; and temperature estimating means for estimating a temperature of at least one of the frictional engaging elements based on the detected engine coolant temperature and the calculated heat quantities calculated by the first and second heat quantity calculating means.

BRIEF DESCRIPTION OF THE DRAWINGS

This and other objects and advantages of the invention will be more apparent from the following description and drawings, in which:

FIG. 2 is a flow chart showing the operation of the system illustrated in FIG. 1; and FIG. 3 is a flow chart showing the subroutine for calculating the heat quantity inflow from the clutch referred to in the routine shown in FIG. 2.

DETAILED DESCRIPTION OF THE PREFERRED EMBODIMENTS

Figure 1:
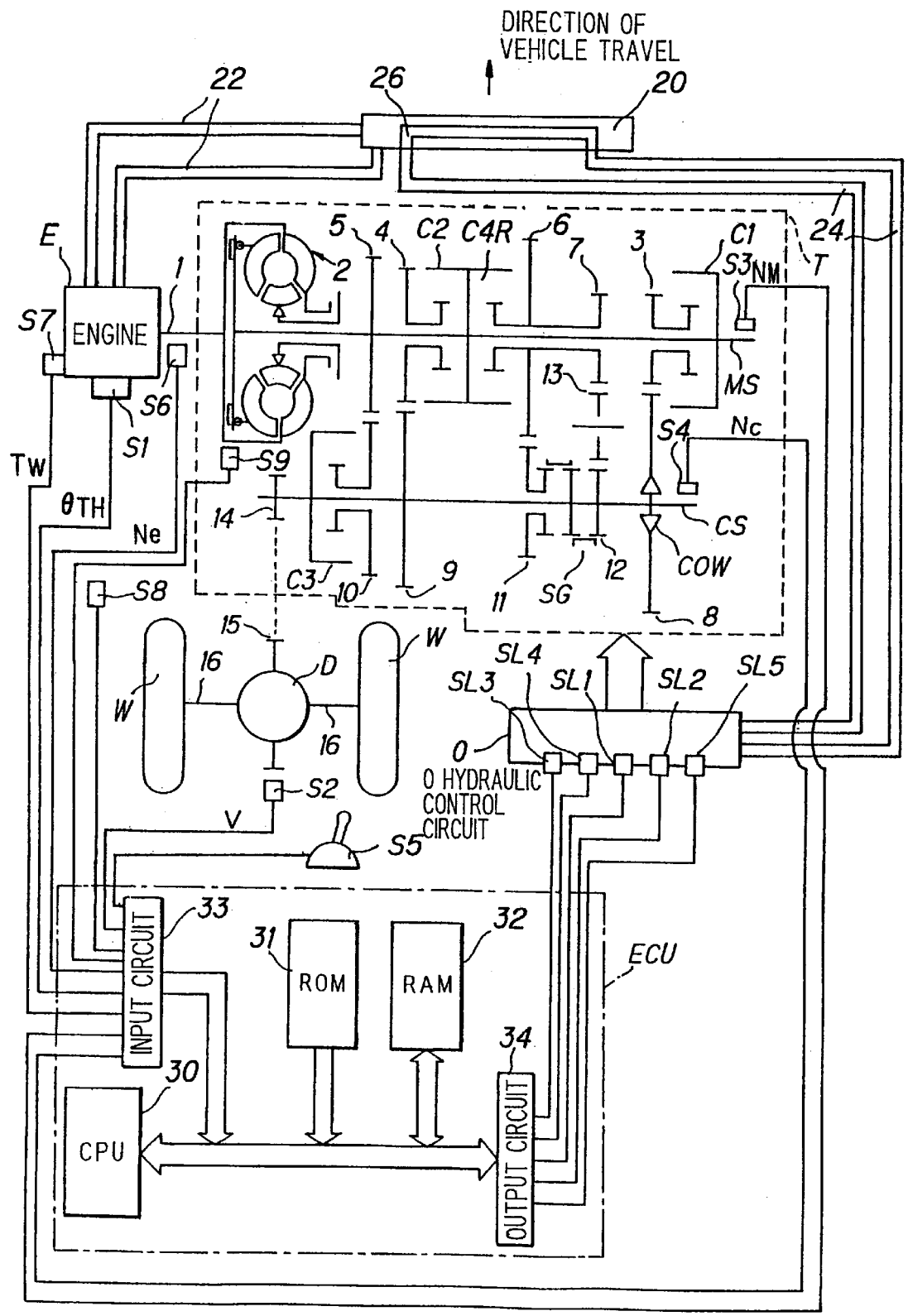
FIG. 1 is an overall view of a system for estimating the temperature of a vehicle hydraulically operated transmission according to the invention.

An embodiment of the invention will now be explained with reference to the attached drawings.

FIG. 1 is an overall schematic view of a system for estimating the temperature of a vehicle hydraulically-operated transmission according to the invention.

As shown in FIG. 1, a vehicle hydraulically-operated automatic transmission T is equipped with a main shaft MS connected to the crankshaft 1 of an internal combustion engine E through a torque converter (fluid coupling means or fluid torque converter) 2 having a lockup mechanism and with a countershaft CS connected to the main shaft MS through multiple gear trains.

The main shaft MS supports a main first-speed gear 3, a main second-speed gear 4, a main third-speed gear 5, a main fourth-speed gear 6 and a main reverse gear 7. The countershaft CS supports a counter first-speed gear 8 engaged with the main first-speed gear 3, a counter second-speed gear 9 engaged with the main second-speed gear 4, a counter third-speed gear 10 engaged with the main third-speed gear 5, a counter fourth-speed gear 11 engaged with the main fourth-speed gear 6 and a counter reverse gear 12 engaged with the main reverse gear 7 through a reverse idle gear 13.

The first-speed stage (first gear) is established when the main first-speed gear 3 rotatably supported on the main shaft MS is connected with the main shaft MS by a first-speed hydraulic clutch C1. Since the first-speed hydraulic clutch C1 is also maintained in the engaged state during establishment of the second to fourth speeds (gears), the counter first-speed gear 8 is supported by a one-way clutch COW.

The second-speed stage (second gear) is established when the main second-speed gear 4 rotatably supported on the main shaft MS is connected with the main shaft MS by a second-speed hydraulic clutch C2. The third-speed stage (third gear) is established when the counter third-speed gear 10 rotatably supported on countershaft CS is connected with the countershaft CS by a third-speed hydraulic clutch C3.

The fourth-speed stage (fourth gear) is established when the counter fourth-speed gear 11 rotatably supported on the countershaft CS is connected with the countershaft CS by a selector gear SG and with this state maintained the main fourth-speed gear 6 rotatably supported on the main shaft MS is connected with the main shaft MS by a fourth-speed/reverse hydraulic clutch C4R.

The reverse-speed (reverse gear) is established when the counter reverse gear 12 rotatably supported on the countershaft CS is connected with the countershaft CS by the selector gear SG and with this state maintained the main reverse gear 7 rotatably supported on the main shaft MS is connected with the main shaft MS by the fourth-speed/reverse hydraulic clutch C4R. The clutches C1, C2, C3 and C4R correspond to the frictional engagement elements mentioned earlier. Gear-shifts are conducted by controlling the engagement and disengagement of these clutches so as to change the engagement state thereof.

The rotation of the countershaft CS is transmitted through a final drive gear 14 and a final driven gear 15 to a differential D, from where it is transmitted to drive wheels W, W through left and right drive shafts 16, 16.

The vehicle (not shown) powered by the internal combustion engine E has a radiator 20 mounted in front. A coolant passage 22 is provided for circulating the engine coolant between the radiator 20 and the internal combustion engine E. An ATF passage 24 for circulating ATF is similarly provided between the radiator 20 and a hydraulic (control) circuit O. The portion of the ATF passage 24 inside the radiator 20 is constituted as an ATF cooler (heart exchanger) 26 for exchanging heat with the engine coolant (medium exchanging heat with the ATF).

A throttle position sensor S1 is provided in the air intake pipe (not shown) of the engine E at a point in the vicinity of a throttle valve (not shown) for generating a signal indicative of the degree of opening θTH of the throttle valve. A vehicle speed sensor (vehicle speed detecting means) S2 for generating a signal indicative of the vehicle traveling speed V from the rotational speed of the final driven gear 15 is provided in the vicinity of the final driven gear 15.

An input shaft rotational speed sensor (output rotational speed detecting means) S3 is provided in the vicinity of the main shaft MS for generating a signal indicative of the rotational speed NM of the transmission input shaft from the rotation of the main shaft MS. An output shaft rotational speed sensor S4 is provided in the vicinity of the countershaft CS for generating a signal indicative of the rotational speed NC of the transmission output shaft from the rotation of the countershaft CS.

A shift lever position sensor S5 is provided in the vicinity of a shift lever (not shown) installed on the vehicle floor near the driver's seat. The shift lever position sensor S5 generates a signal indicating which of the seven positions P, R, N, D4, D3, 2, 1 has been selected by the driver. A crank angle sensor (engine speed detecting means) S6 is provided in the vicinity of the crankshaft 1 of the internal combustion engine E for generating a signal indicative of the engine speed Ne from the rotation of the crankshaft 1. A coolant temperature sensor (coolant temperature detecting means) S7 for generating a signal indicative of the engine coolant temperature is provided at an appropriate location in the coolant passage 22. An ambient air temperature sensor (ambient air temperature detecting means) S8 is provided at an appropriate location on the vehicle for generating a signal indicative of the ambient temperature outside the vehicle.

A torque converter input rotational speed sensor (input rotational speed detecting means) S9 is provided in the vicinity of the torque converter 2 for generating a signal indicative of the rotational speed of the pump of the torque converter 2. Although this embodiment is provided with the crank angle sensor S6 and the torque converter input rotational speed sensor S9, either of these sensors can serve in place of the other when the input shaft of the torque converter 2 is directly connected with the crankshaft 1.

The outputs of the sensors S1 etc., are sent to an ECU (electronic control unit).

The ECU is constituted as a microcomputer comprising a CPU (central processing unit) 30, a ROM (read-only memory) 31, a RAM (random access memory) 32, an input circuit 33 and an output circuit 34. The outputs of the sensors S1 etc. are input to the microcomputer through the input circuit 33. The RAM 32 is provided with a backed-up section which retains the stored contents even when the engine is stopped.

The CPU 30 of the microcomputer determines the gear (gear ratio or stage) to be shifted to and energizes/deenergizes shift solenoids SL1, SL2 of the hydraulic control circuit O via the output circuit 34 so as to switch shift valves (not shown) and thereby disengage/engage the hydraulic clutches of prescribed speeds. It also controls the operation of the lockup mechanism of the torque converter 2 through control solenoids SL3, SL4 and controls the clutch oil pressure through a linear solenoid SL5. The CPU 30 of the microcomputer also estimates the temperatures of the hydraulic clutches, as explained later.

FIG. 2 is a flow chart of the main routine for estimating the temperatures of the hydraulic clutches Cn (i.e., C1, C2, C3 and C4R) according to the invention. The explanation of this figure will, however, be preceded by a brief explanation of the estimation method.

The temperature of a hydraulic clutch Cn (hereinafter "Tcl(No)") is substantially estimated by estimating the temperature of the ATF and the temperature of a frictional material such as a disc plate in the hydraulic clutch (hereinafter "TATF"). The clutch temperature is estimated separately for each hydraulic clutch. Specifically, the "No" of Tcl(No) indicates one of the first-to-fourth-speed hydraulic clutches C1, C2, C3 and C4R. (The first-speed hydraulic clutch C1 does not generate heat, however, since it is a one-way clutch.)

As pointed out at the beginning, the ATF temperature TATF and the engine coolant temperature Tw ordinarily follow a similar variation pattern but may nevertheless differ greatly depending on the vehicle operating condition. In the estimation, therefore, the coolant temperature at the time of engine starting is taken as the starting estimated value of the ATF temperature TATF. The temperature rise caused by heat inflow and the temperature fall caused by heat outflow per unit time are quantitatively estimated based on the state of the torque converter, the type of gear-shift (specifically, the gear ratio difference, i.e., the difference in heat quantity inflow owing to friction), the vehicle speed (temperature rise owing to ATF stirring and fall owing to air cooling), the state of the radiator (heat exchange with the engine coolant in the radiator), and the like. The estimated values are summed and the sum is defined as the estimated ATF (and the frictional material) temperature TATF in the hydraulic clutch Cn, namely, as the estimated hydraulic clutch temperature Tcl (No).

Specifically, the heat quantity inflow from the torque converter, the heat quantity inflow from the clutch (frictional engagement element), the heat quantity inflow owing to ATF stirring, the heat quantity inflow (or outflow) at the radiator and the heat quantity outflow to the ambient air, per second, are calculated, and the ATF temperature TATF is estimated based on the sum of the calculated values. In other words, the current ATF temperature TATF(n) in the clutch is estimated by successively adding the aforesaid sum to the coolant temperature at engine starting once per second. Here, n means a sampling number in a discrete time series and more particularly a cycle or interval at which the routine of the flow chart of FIG. 2 is activated.

The heat flow relative to the ambient air is a value in the direction of cooling (heat outflow) and is therefore treated as a negative value. Since the heat exchange at the radiator can be in either the heating (positive) or the cooling (negative) direction, it is treated as positive or negative depending on the direction of the heat flow. The remaining factors have only heating direction values and are all treated as positive.

The routine of the flow chart of FIG. 2 will now be explained. It is activated at the time of engine starting and then cyclically repeated at regular intervals thereafter, i.e., once per second.

The engine speed Ne, the engine coolant temperature Tw and other parameters are first read in S10. The program then goes to S12, in which it is checked whether the engine is in starting mode. When the result in S12 is YES, the program goes to S14, in which the detected coolant temperature Tw is defined as Tcl(No)(n−1), i.e., the clutch temperature in the preceding cycle, on the assumption that, owing to the engine having been stopped, the ATF temperature TATF, specifically, the ATF temperature TATF in the clutch, more specifically, the clutch temperature Tcl(No) is approximately the same as the coolant temperature Tw.

The program then goes to S16, in which the heat quantity inflow ΔTtr from the torque converter is determined.

Where ΔQ[J] is the heat quantity required to raise the temperature T[K] of a substance of mass m[g] by ΔT[K], the specific heat at temperature T is given by ΔQ/mΔT when ΔT approaches 0 as a limit. When the temperature dependence of the specific heat is sufficiently gradual, the specific heat defines the heat quantity required to increase 1 g of the substance by 1 K.

The difference between the energy input to and output from the torque converter can be considered to be energy absorbed by the torque converter as heat owing to fluid friction etc., and the adsorbed heat can be assumed to produce an increase in the temperature of the ATF. The temperature increase (heat inflow) produced by the torque converter per unit time can therefore be calculated from the energy absorbed by the torque converter, the specific heat of the ATF and the specific heat of the steel, aluminum and other metals constituting the torque converter.

In light of the foregoing, the heat quantity inflow $\Delta Ttr$ from the torque converter can be calculated from Eq. 1.

$$\Delta Ttr = (1-\eta) \times \tau (Ne/1000)^2 g \times NIN [J/sec] \quad (Eq. 1)$$

where $\eta$: torque converter efficiency,

NIN: input rotational speed [rad/sec]

$\tau$: pump absorption torque coefficient $\tau(Ne/1000)^2 g$: pump absorption torque.

In Eq. 1, NIN (input rotational speed) is calculated from the output value of the torque converter input rotational speed sensor S9 (but, as mentioned earlier, can instead be calculated from the engine speed Ne detected by the crank angle sensor S6). $\tau$ is the pump absorption torque. $\eta$ is an intrinsic characteristic of the fluid torque converter. Since $\eta$ is a function of the input-output rotational speed ratio e and independent of the input rotational speed, $\eta$ can be mapped beforehand for retrieval using the input-output rotational speed ratio e as address data.

The program then advances to S18 in the flow chart of FIG. 2 for calculation of the heat quantity inflow (amount of temperature change) ΔTcl(No) from the hydraulic clutch Cn.

Since the heat quantity inflow ΔTcl(No) from the clutch can be assumed to be proportional to the product of the difference between the clutch input and output rotational speeds (relative rotation) and the clutch transfer torque, it can be calculated according to Eq. 2.

$$\Delta Tcl(No) = (\tfrac{1}{2}) \times (NIN-NOUT) \times A \times \tau (Ne/1000)^2 g \; [J/sec] \quad (Eq. 2)$$

where

No: one of the clutches (NIN−NOUT): relative rotational speed [rad/sec],

A: clutch allowance rate.

The multiplication of the calculated value of (relative rotation×clutch transfer torque) by ½ in Eq. 2 is to enable an approximate calculation of the heat quantity inflow per unit time by use of a constant speed change rate notwithstanding that the relative rotation approaches zero as the speed change proceeds. NIN is again calculated from the output of the torque converter input rotational speed sensor S9 (or the crank angle sensor S6), and NOUT is calculated from the main shaft rotational speed NM.

Since (NIN−NOUT) and A are determined by the gears to be shifted to and to be shifted from and the engine speed, in this embodiment the other coefficients are grouped and the calculation is simplified as shown by Eq. 3.

$$\Delta Tcl(No) = A \times (Ne/1000) [J/sec] \quad (Eq. 3)$$

A is a parameter termed the "clutch allowance rate" by the inventors. It is a value indicating toughness against engine revving and indicative of the clutch engagement strength. It is calculated as the ratio of clutch capacity to engine output as (clutch torque transfer capacity on engaged side+clutch torque transfer capacity on disengaged side)/input torque.

This is explained in detail in the assignee's Japanese Patent Laid-Open Application No. Hei 8(1996)-121,583.

FIG. 3 is the flow chart of a subroutine for calculating the heat quantity inflow ΔTcl(No) from the clutch. First, in S100, it is checked whether the selected position is R (reverse driving) or N (neutral). When the result is NO, the program goes to S102, in which it is checked whether a gear-shift has occurred, specifically whether an upshift has occurred. When the result is YES, the program goes to S104, in which the heat quantity inflow ΔTcl(No) at the clutch is calculated as shown in the figure.

As shown, the heat quantity inflow is calculated separately for each clutch. To be specific, the value at an upshift from first speed (gear) to second speed (gear) is defined as the heat quantity inflow ΔTcl(2)(n) of the second-speed clutch C2, the value at an upshift from second speed (gear) to third speed (gear) is defined as the heat quantity inflow ΔTcl(3)(n) of the third-speed clutch C3 and the value at an upshift from third speed (gear) to fourth speed (gear) is defined as the heat quantity inflow ΔTcl(4)(n) of the fourth-speed/reverse clutch C4R. Since as was noted earlier the first-speed clutch C1 does not produce heat, the heat quantity inflow ΔTcl(1)(n) thereof is defined as zero.

The clutch allowance rates A calculated from the clutch capacities and the like in conjunction with the foregoing have different values A2, A3 and A4. The amount of friction and, accordingly, the heat quantity inflow, differs depending on the gear ratio. Calculating the clutch allowance rate separately for each gear enables better estimation of the heat quantity inflow.

On the other hand, when S102 in FIG. 3 finds that upshift has not occurred, the program goes to S106, in which every heat quantity inflow ΔTcl(No)(n) is set to zero. This because the heat quantity produced by friction during a downshift is small owing to the fact that the shift is ordinarily conducted after controlling co-engagement of the gears to increase the engine speed and reduce the relative rotation difference, while the heat quantity generated during an upshift is ordinarily large because the difficulty of implementing the same technique makes it necessary to absorb most of the relative rotation difference by clutch friction. The heat quantity inflow is thus calculated only when an upshift occurs.

When the result in S100 is YES, the heat quantity inflow is not calculated because the clutch does not operate in the N position and gear-shift is impossible in the R position.

The program then goes to S20 in the flow chart of FIG. 2 for calculation of the heat quantity inflow ΔTst owing to stirring.

Since the heat quantity inflow ΔTst owing to stirring results from stirring of the ATF by the gears, i.e., from stirring friction, it is calculated according to Eq.4.

$$\Delta Tst = B \times V^2 [\text{J/sec}] \qquad (\text{Eq. 4})$$

where

B: coefficient [N],

V: vehicle traveling speed [m/sec].

ΔTst is calculated as the product of the square of the vehicle traveling speed V and a coefficient B because the ATF contained in the transmission case is stirred during vehicle driving by the rotation of various gears, including the final drive gear 14, the final driven gear 15 and the gears on the countershaft CS, and the rotational speed NC of these gears is proportional to the vehicle traveling speed V. The coefficient B is an appropriate value determined experimentally. The countershaft rotational speed NC can of course be used in place of the vehicle traveling speed V.

The program then advances to S22, in which the heat quantity inflow (outflow) ΔTra at the radiator is calculated.

As was explained earlier with reference to FIG. 1, heat is exchanged between the ATF and the engine coolant in the radiator 20. The heat quantity inflow (outflow) ΔTra relative to the ATF temperature at the radiator is therefore calculated according to Eq. 5.

$$\Delta Tra = C \times (Tw \times Tcl(No)(n-1)) [\text{J/sec}] \qquad (\text{Eq. 5})$$

where

C: coefficient [N·m/°C.sec],

Tw: Coolant temperature [°C.].

In other words, the calculation is made by subtracting the ATF temperature, specifically, the ATF temperature in the hydraulic clutch, more specifically, Tcl(No)(n−1) (value estimated in the preceding cycle), from the coolant temperature Tw and multiplying the difference by the coefficient C. As a result, the calculated value is positive (heat inflow) when the coolant temperature Tw is higher and is negative (heat outflow) when the coolant temperature Tw is lower. The coefficient C in Eq. 5 is determined experimentally.

The program then goes to S24, in which the heat quantity outflow ΔTta to the ambient air is calculated.

The ambient air cools the ATF. As explained earlier, therefore, the heat flow relative to the ambient air is treated as heat outflow, not heat inflow. The cooling by (heat outflow to) the ambient air is proportional to the wind velocity (in other words, the vehicle traveling speed) and is dependent on the difference between the transmission temperature (substantially equivalent to the ATF temperature) and the temperature of the ambient air. The heat quantity outflow ΔTta is therefore calculated according to Eq. 6.

$$\Delta Tta = D \times (Tair - Tcl(No)(n-1)) \times V [\text{J/sec}] \qquad (\text{Eq. 6})$$

where

D: coefficient [N/C]

Tair: Ambient air temp. [°C.].

The calculation according to Eq. 6 is adopted because the amount of change in the ATF temperature TATF, specifically, the ATF temperature in the hydraulic clutch, namely, Tcl (No), per unit time can be considered to be proportional to the difference between the ambient air temperature Tair and the ATF temperature TATF, specifically, the ATF temperature in the hydraulic clutch, namely, Tcl(No). D is an appropriately defined coefficient.

The program then advances to S26 in the flow chart of FIG. 2 for summing the values calculated in the foregoing manner and adding the result to the clutch temperature Tcl(No)(n−1) in the preceding cycle to obtain the clutch temperature Tcl(No)(n) in the current cycle. As mentioned earlier, the calculated heat quantity flow ΔTra relative to the radiator can be either positive or negative and the calculated heat quantity flow ΔTta relative to the ambient air is always negative.

The program then goes to S28, in which the value of Tcl(No)(n−1) in the preceding cycle is replaced by the value of Tcl(No)(n) calculated in the current cycle for use in the calculation in the next cycle, whereafter the routine is terminated. Therefore, at each following activation of the routine, when S12 finds that engine is not in starting mode, the program skips S14 and the value rewritten in S28 is used as the value in the preceding cycle. The updated value in S28 is stored to the backed-up section of the RAM 32 when the engine is stopped. When the result in S 12 is negative and when the clutch temperature Tcl(No) in the preceding cycle is not available for some reason, an appropriately value is set.

Owing to the configuration described in the foregoing, this embodiment is able to estimate the temperature of the clutch (frictional engagement element) with high accuracy, without use of an oil pressure sensor. The oil pressure can therefore be appropriately controlled based on the estimated values to prevent unexpected gear-shift shock and degradation of clutch durability. Moreover, the configuration of the system is simple.

In this embodiment, the temperature of the hydraulic clutches (frictional engagement elements) is estimated based on various calculated heat quantity inflows and outflows, as shown in S16 to S24 of FIG. 2. However, it is not absolutely necessary to make all of the calculations indicated in S16 to S24 and the temperature of the hydraulic clutches can instead be estimated by calculating only some of these values, e.g., those indicated in S16 and S18. This is the meaning of "at least" in the claims.

When S12 in the embodiment set out in the foregoing finds that the engine is in starting mode, S14 defines the coolant temperature as the clutch temperature (value in preceding cycle). Since the clutch temperature estimated immediately before engine turnoff is stored in the backed-up section of RAM 32, however, it is instead possible to clock the time from engine turnoff and when S12 finds that the engine is in starting mode to use the backed-up value of the clutch temperature (value in preceding cycle) if the clocked time is relatively short.

While the foregoing refers to only a clutch as an example of a frictional engagement element, the invention also encompasses the case where the frictional engagement element further includes a brake.

Although the invention has thus been shown and described with reference to specific embodiments, it should be noted that the invention is in no way limited to the details of the described arrangement, but changes and modifications may be made without departing from the scope of the invention, which is defined by the appended claims.

What is claimed is:

1. A system for estimating temperature of a plurality of frictional engaging elements installed in a vehicle hydraulically-operated transmission including a hydraulic coupling means having an input connected to an internal combustion engine mounted on the vehicle and an output connected to a gear system of the transmission, comprising:

a hydraulic pressure supplying circuit for discharging hydraulic pressure from one of said plurality of frictional engaging elements and for supplying hydraulic pressure to another one of said plurality of frictional engaging elements to bring said one and another one of said plurality of frictional engaging elements into operation such that gear-shift is effected in the transmission;

coolant temperature detecting means for detecting a coolant temperature of the engine;

first heat quantity calculating means for calculating a heat quantity generated by the hydraulic coupling means;

second heat quantity calculating means for calculating a heat quantity generated by the respective frictional engaging elements; and frictional engaging element temperature estimating means for estimating temperatures of the respective frictional engaging elements based on the detected engine coolant temperature and the calculated heat quantities calculated by the first and second heat quantity calculating means.

2. A system for estimating temperature of a plurality of frictional engaging elements installed in a vehicle hydraulically-operated transmission including a hydraulic coupling means having an input connected to an internal combustion engine mounted on the vehicle and an output connected to a gear system of the transmission, comprising:

a hydraulic pressure supplying circuit for discharging hydraulic fluid from one of said plurality of frictional engaging elements and for supplying hydraulic fluid to another one of said plurality of frictional engaging elements to bring said one and another one of said plurality of frictional engaging elements into operation such that gear-shift is effected in the transmission;

coolant temperature detecting means for detecting a coolant temperature of the engine;

first heat quantity calculating means for calculating a heat quantity generated by the hydraulic coupling means;

second heat quantity calculating means for calculating a heat quantity generated by the respective frictional engaging elements including the frictional engaging element at gearshift;

third heat quantity calculating means for calculating a heat quantity generated by stirring of the hydraulic fluid;

fourth heat quantity calculating means for calculating a heat quantity generated or absorbed at a heat exchanger which exchanges heat from the fluid; and frictional engaging element temperature estimating means for estimating temperatures of the respective frictional engaging elements based on the detected engine coolant temperature and the calculated heat quantities calculated by the first, second, third and fourth heat quantity calculating means.

3. A system according to claim 1, wherein the hydraulic coupling means is a hydraulic torque converter, and said first heat quantity means comprising:

input rotational speed detecting means for detecting an input rotational speed of an input member of the torque converter;

output rotational speed detecting means for detecting an output rotational speed of an output member of the torque converter; and heat quantity estimating means for calculating the heat quantity generated by the hydraulic torque converter based on at least the detected input and output rotational speeds of the torque converter, an efficiency of the torque converter and a pump absorption torque coefficient.

4. A system according to claim 2, wherein the hydraulic coupling means is a hydraulic torque converter, and said first heat quantity means comprising:

input rotational speed detecting means for detecting an input rotational speed of an input member of the torque converter;

output rotational speed detecting means for detecting an output rotational speed of an output member of the torque converter; and heat quantity estimating means for calculating the heat quantity generated by the hydraulic torque converter based on at least the detected input and output rotational speeds of the torque converter, an efficiency of the torque converter and a pump absorption torque coefficient.

5. A system according to claim 2, wherein said second heat quantity calculating means calculates the heat quantity generated by the respective frictional engaging elements including the frictional engaging element at an upshift.

6. A system according to claim 1, wherein said second heat quantity calculating means comprising;
gear determining means for determining gears to be shifted from and to be shifted to;
engine speed detecting means for detecting a speed of the engine; and
heat quantity estimating means for calculating the heat quantity generated by the respective frictional engaging elements based on at least the detected gears and engine speed.

7. A system according to claim 6, wherein the the respective frictional engaging elements includes the frictional engaging element for the gear to be shifted to.

8. A system according to claim 2, wherein said second heat quantity calculating means comprising;
gear determining means for determining gears to be shifted from and to be shifted to;
engine speed detecting means for detecting a speed of the engine; and
heat quantity estimating means for calculating the heat quantity generated by the respective frictional engaging elements based on at least the detected gears and engine speed.

9. A system according to claim 8, wherein the the respective frictional engaging elements includes the frictional engaging element for the gear to be shifted to.

10. A system according to claim 2, wherein said third heat quantity calculating means comprising;
vehicle speed detecting means for detecting a traveling speed of the vehicle; and
heat quantity estimating means for calculating the heat quantity generated by stirring of the hydraulic fluid based on at least the detected vehicle traveling speed.

11. A system according to claim 2, wherein said fourth heat quantity calculating means calculates the heat quantity generated or absorbed at the heat exchanger cyclically, and comprising:
heat quantity estimating means for calculating the heat quantity generated or absorbed at the heat exchanger based on at least a difference between the heat quantity generated by the respective frictional engaging elements and estimated in a preceding cycle and the detected engine coolant temperature.

12. A system according to claim 2, further comprising:
fifth heat quantity calculating means for calculating a heat quantity relative to ambient air cyclically; and said frictional engaging element temperature estimating means estimates temperatures of the respective frictional engaging elements based on the detected engine coolant temperature and the calculated heat quantities calculated by the first, second, third, fourth and fifth heat quantity calculating means.

13. A system according to claim 12, wherein said fifth heat quantity calculating means comprising;
ambient air temperature detecting means for detecting an ambient air temperature; and
heat quantity estimating means for calculating the heat quantity relative to ambient air based on at least a difference between the heat quantity generated by the respective frictional engaging elements and estimated in a preceding cycle and the detected ambient air temperature.

14. A system according to claim 13, wherein said fifth heat quantity calculating means further comprising;
vehicle speed detecting means for detecting a traveling speed of the vehicle; and
said heat quantity estimating means calculates the heat quantity relative to ambient air based on at least the difference and the detected vehicle traveling speed.

15. A method for estimating temperature of a plurality of frictional engaging elements installed in a vehicle hydraulically-operated transmission including a hydraulic coupling means having an input connected to an internal combustion engine mounted on the vehicle and an output connected to a gear system of the transmission, comprising:
a hydraulic pressure supplying circuit for discharging hydraulic pressure from one of said plurality of frictional engaging elements and for supplying hydraulic pressure to another one of said plurality of frictional engaging elements to bring said one and another one of said plurality of frictional engaging elements into operation such that gear-shift is effected in the transmission;
comprising the steps of:
(a) detecting a coolant temperature of the engine;
(b) calculating a heat quantity generated by the hydraulic coupling means;
(c) calculating a heat quantity generated by the respective frictional engaging elements; and
(d) estimating temperatures of the respective frictional engaging elements based on the detected engine coolant temperature and the calculated heat quantities.

16. A method for estimating temperature of a plurality of frictional engaging elements installed in a vehicle hydraulically-operated transmission including a hydraulic coupling means having an input connected to an internal combustion engine mounted on the vehicle and an output connected to a gear system of the transmission, including:
a hydraulic pressure supplying circuit of discharging hydraulic fluid from one of said plurality of frictional engaging elements and for supplying hydraulic fluid to another one of said plurality of frictional engaging elements to bring said one and another one of said plurality of frictional engaging elements into operation such that gear-shift is effected in the transmission;
comprising the steps of:
(a) detecting a coolant temperature of the engine;
(b) calculating a heat quantity generated by the hydraulic coupling means;
(c) calculating a heat quantity generated by the respective frictional engaging elements including the frictional engaging element at gear-shift;
(d) calculating a heat quantity generated by stirring of the hydraulic fluid;
(e) calculating a heat quantity generated or absorbed at a heat exchanger which exchanges heat from the fluid; and
(f) estimating temperatures of the respective frictional engaging elements based on the detected engine coolant temperature and the calculated heat quantities.

17. A method according to claim 15, wherein the hydraulic coupling means is a hydraulic torque converter, and said step (b) comprising the steps of:

detecting an input rotational speed of an input member of the torque converter;

detecting an output rotational speed of an output member of the torque converter; and calculating the heat quantity generated by the hydraulic torque converter based on at least the detected input and output rotational speeds of the torque converter, an efficiency of the torque converter and a pump absorption torque coefficient.

18. A method according to claim 16, wherein the hydraulic coupling means is a hydraulic torque converter, and said (b) comprising the steps of:

detecting an input rotational speed of an input member of the torque converter;

detecting an output rotational speed of an output member of the torque converter; and calculating the heat quantity generated by the hydraulic torque converter based on at least the detected input and output rotational speeds of the torque converter, an efficiency of the torque converter and a pump absorption torque coefficient.

19. A method according to claim 16, wherein said step (c) comprising the step of:

calculating the heat quantity generated by the respective frictional engaging elements including the frictional engaging element at an upshift.

20. A method according to claim 15, wherein said step (c) comprising the steps of;

determining gears to be shifted from and to be shifted to;

detecting a speed of the engine; and calculating the heat quantity generated by the respective frictional engaging elements based on at least the detected gears and engine speed.

21. A method according to claim 20, wherein the the respective frictional engaging elements includes the frictional engaging element for the gear to be shifted to.

22. A method according to claim 16, wherein said step (c) comprising the steps of;

determining gears to be shifted from and to be shifted to;

detecting a speed of the engine; and calculating the heat quantity generated by the respective frictional engaging elements based on at least the detected gears and engine speed.

23. A method according to claim 22, wherein the the respective frictional engaging elements includes the frictional engaging element for the gear to be shifted to.

24. A method according to claim 16, wherein said step (d) comprising the steps of;

detecting a traveling speed of the vehicle; and calculating the heat quantity generated by stirring of the hydraulic fluid based on at least the detected vehicle traveling speed.

25. A method according to claim 16, wherein said step (e) calculates the heat quantity generated or absorbed at the heat exchanger cyclically, and comprising the steps of:

calculating the heat quantity generated or absorbed at the heat exchanger based on at least a difference between the heat quantity generated by the respective frictional engaging elements and estimated in a preceding cycle and the detected engine coolant temperature.

26. A method according to claim 16, further comprising the steps of:

calculating a heat quantity relative to ambient air cyclicaly; and said step (f) estimates temperatures of the respective frictional engaging elements based on the detected engine coolant temperature and the calculated heat quantities.

27. A method according to claim 26, wherein said step (g) comprising the steps of;

detecting an ambient air temperature; and calculating the heat quantity relative to ambient air based on at least a difference between the heat quantity generated by the respective frictional engaging elements and estimated in a preceding cycle and the detected ambient air temperature.

28. A method according to claim 27, wherein said step comprising the steps of;

detecting a traveling speed of the vehicle; and calculating the heat quantity relative to ambient air based on at least the difference and the detected vehicle traveling speed.

* * * * *